US007068582B2

(12) United States Patent
Jin

(10) Patent No.: US 7,068,582 B2
(45) Date of Patent: Jun. 27, 2006

(54) READ HEAD FOR ULTRA-HIGH-DENSITY INFORMATION STORAGE MEDIA AND METHOD FOR MAKING THE SAME

(75) Inventor: Sungho Jin, San Diego, CA (US)

(73) Assignee: The Regents of The University of California, La Jolla, CA (US)

( * ) Notice: Subject to any disclaimer, the term of this patent is extended or adjusted under 35 U.S.C. 154(b) by 0 days.

(21) Appl. No.: 10/261,217

(22) Filed: Sep. 30, 2002

(65) Prior Publication Data
US 2004/0062177 A1   Apr. 1, 2004

(51) Int. Cl.
G11B 7/00   (2006.01)
(52) U.S. Cl. ...................................... 369/101
(58) Field of Classification Search ............... 369/101, 369/126, 44.16
See application file for complete search history.

(56) References Cited

U.S. PATENT DOCUMENTS

| | | | | |
|---|---|---|---|---|
| 4,786,922 A * | 11/1988 | Hosoki et al. | ............... | 347/121 |
| 5,159,513 A | 10/1992 | Dieny et al. | ............... | 360/113 |
| 5,576,914 A | 11/1996 | Rottmayer et al. | ......... | 360/113 |
| 5,587,223 A | 12/1996 | White | ......................... | 428/195 |
| 5,668,689 A | 9/1997 | Schultz et al. | ............... | 360/113 |
| 5,820,769 A | 10/1998 | Chou | ........................... | 216/22 |
| 5,940,314 A * | 8/1999 | Suzuki et al. | ................... | 365/10 |
| 6,081,408 A | 6/2000 | Partee | ......................... | 360/113 |
| 6,280,813 B1 | 8/2001 | Carey et al. | ............... | 428/65.3 |
| 6,356,420 B1 | 3/2002 | Everitt | ................... | 360/324.12 |
| 6,440,520 B1 | 8/2002 | Baglin et al. | ............... | 428/65.3 |
| 6,587,408 B1 * | 7/2003 | Jacobson et al. | ......... | 369/44.16 |
| 6,621,096 B1 * | 9/2003 | Lee et al. | ...................... | 257/10 |
| 6,671,778 B1 * | 12/2003 | Naberhuis et al. | ........... | 711/114 |
| 6,738,336 B1 * | 5/2004 | Naberhuis | .................... | 369/101 |
| 6,741,524 B1 * | 5/2004 | Ichihara et al. | ........... | 369/13.01 |
| 6,864,624 B1 * | 3/2005 | Birecki et al. | ............... | 313/336 |
| 2003/0096104 A1 | 5/2003 | Tobita et al. | ................ | 428/332 |
| 2003/0175462 A1 | 9/2003 | Nishino et al. | ........... | 428/36.91 |

OTHER PUBLICATIONS

C.A. Ross et al., "Micromagnetic behavior of electrodeposited cylinder arrays," Phys. Rev., vol. B65, pp. 144417-1-144417-8 (2002).

(Continued)

Primary Examiner—Angel Castro
(74) Attorney, Agent, or Firm—Lowenstein Sandler PC

(57) ABSTRACT

A micro-electro-mechanical systems (MEMS) device is presented that can read very high density magnetic media and very high density CD ROMs. Both the magnetic and optical read heads comprise one or more cold cathode MEMS e-beam cells. The e-beams are deflected according to the data bit being interrogated and the state of that bit is determined by a detector. Large arrays of such cells can simultaneously read large areas of the memory media. Arrays of such MEMs detectors can comprise a plurality of "steerable" e-beam emitters that can be directed to interrogate specific data sites on the magnetic media. Thus, in some cases, the media can remain stationary. Densities of 200 gigabits per square inch or more and read speeds greater than 1000 times faster can be achieved.

14 Claims, 5 Drawing Sheets

OTHER PUBLICATIONS

H. Zeng et al., "Magnetic properties of self-assembled Co nanowires of varying length and diameter," Journal of Appl. Physics, vol. 87, No. 9, pp. 4718-4720 (2000).

Y. Peng et al., "Magnetic properties and magnetization reversal of alpha-iron nanowires deposited in alumina film," Journal of Appl. Physics, vol. 87, No. 10, pp. 7405-7408 (2000).

M. Terrones et al., "Advances in the creation of filled nanotubes and novel nanowires," MRS Bulletin, Aug. 1999, pp. 43-49 (1999).

X. Ye et al., "Supercritical Fluid Fabrication of Metal Nanowires and Nanorods Templated by Multiwalled Carbon Nanotubes," Advanced Materials, vol. 15, No. 4, pp. 316-319 (2003).

A. Govindaraj et al., "Metal Nanowires and Intercalated Metal Layers in Single-Walled Carbon Nanotube Bundles," Chem. Mater., vol. 12, p. 202-205 (2000).

B. Pradhan et al., "Nickel nanowires of 4 nm diameter in the cavity of carbon nanotubes," Chem. Commun., Issue 14, p. 1317-1318 (1999).

S. Liu et al., "Preparation and Characteristics of Carbon Nanotubes Filled with Cobalt," Chem. of Mater., vol. 12, p. 2205-2211 (2000).

* cited by examiner

Magnetic Read Head Using Cold Cathode

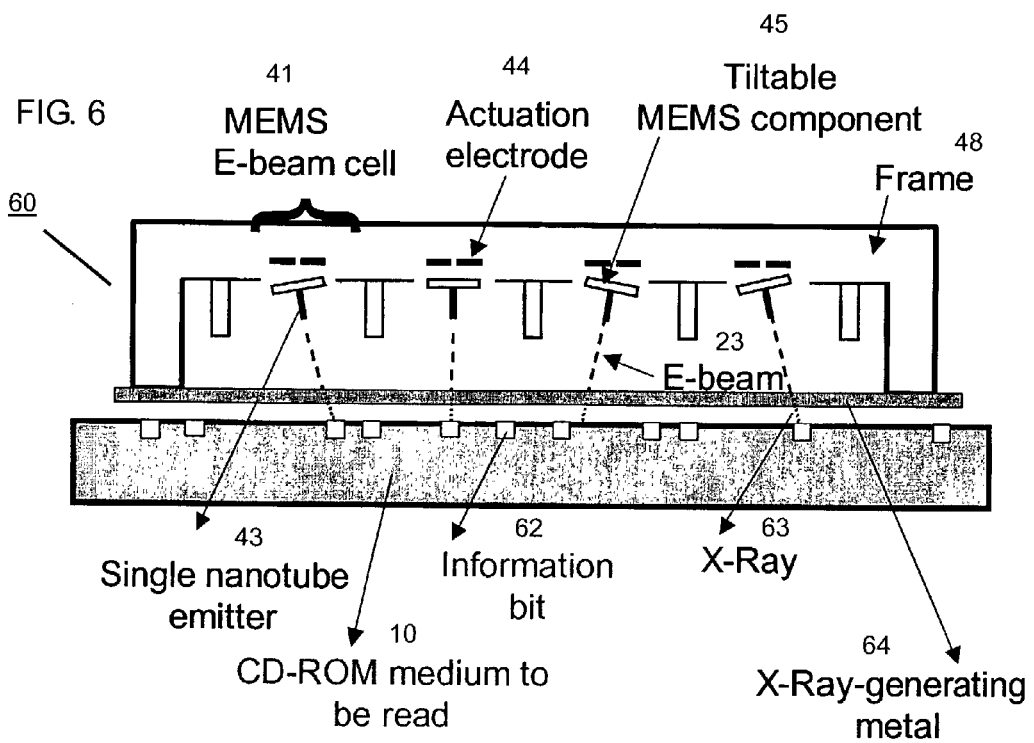
FIG. 6
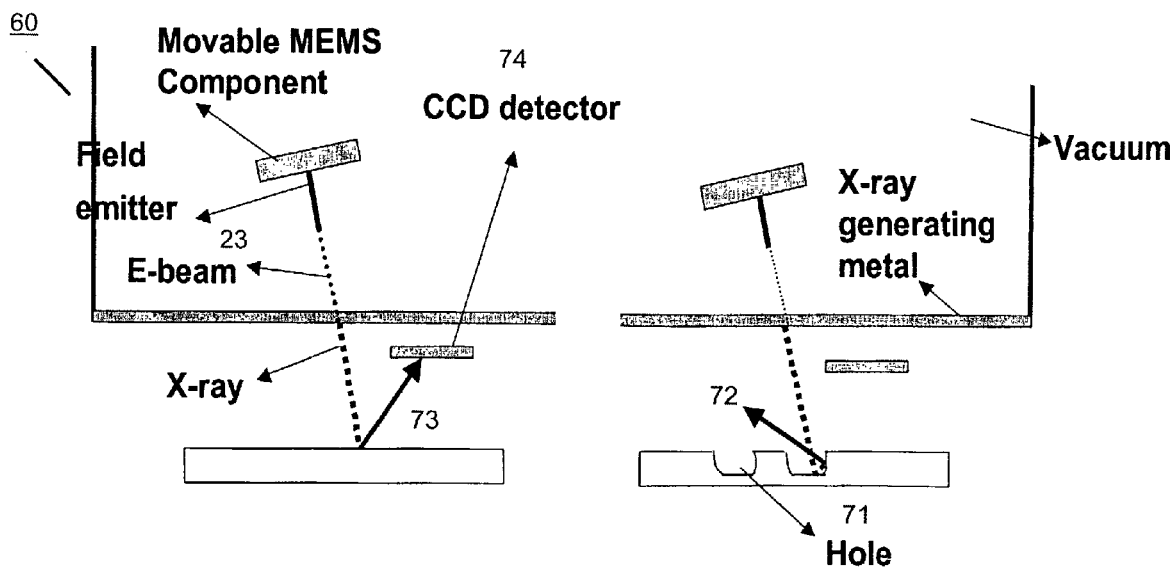
FIG. 7A
FIG. 7B

READ HEAD FOR ULTRA-HIGH-DENSITY INFORMATION STORAGE MEDIA AND METHOD FOR MAKING THE SAME

FIELD OF THE INVENTION

This invention relates to apparatus for storing information and, in particular, to a read head for high density information storage media.

BACKGROUND OF THE INVENTION

High-density information storage, such as magnetic recording and topographic recording on compact discs, is an important part of modem computer technology. Conventional magnetic recording systems, such as computer hard disk drives, typically use a continuous magnetic thin film on a rigid substrate as the recording medium. Each bit of information is stored by magnetizing a small area on the thin magnetic film using a write head that provides a suitable writing magnetic field. The magnetization strength and the location of each magnetic bit must be defined precisely to allow a flying read head (sensitive magnetic field sensor) to retrieve the written information. Each magnetic bit in the magnetic recording media contains one magnetized region consisting of many small magnetized grains. Because of the trend toward higher recording density, the magnetic bit size is continuously being reduced to a point approaching superparamagnetic limits of magnetic recording.

In order to overcome superparamagnetic limits of magnetic recording, patterned magnetic media with discrete magnetic regions have been proposed, for example, see U.S. Pat. No. 5,820,769 to Chou et al., U.S. Pat. No. 5,5587,223 to White et al., U.S. Pat. No. 6,440,520 B1 to Baglin et al., and co-pending U.S. patent application Ser. No. 10/262,462, "Ultra-high-density information storage medium and method for making the same", by S. Jin, filed Sep. 30, 2002, now abandoned, and corresponding divisional application Ser. No. 11/020.286, filed Dec. 8, 2004. Another approach of reducing the superparamagnetic instability problem is to use a magnetic recording media with antiferromagnetically coupled ferromagnetic films separated by a very thin layer of non-magnetic spacer material, such as described in U.S. Pat. No. 6,280,813 to Carey, et al. issued Aug. 28, 2001.

Conventional magnetic read/write heads are generally based on magneto-resistive (MR) sensors or giant magneto-resistant (GMR) sensors. See U.S. Pat. No. 6,081,408 issued to Partee et al., Jun. 27, 2000; U.S. Pat. No. 5,668,689 issued to Schultz et al., Sep. 16, 1997; U.S. Pat. No. 5,159,513 issued to Dieny et al., Oct. 27, 1992; U.S. Pat. No. 6,356,420 issued to Everitt et al., Mar. 12, 2002; and U.S. Pat. No. 5,576,914 issued to Rottmayer et al., Nov. 19, 1996. While MR sensors and GMR sensors have been adequate for reading of magnetic bits in today's recording media, they are not likely to be sensitive enough for future ultra-high-density recording media ($\geq 200$ gigabits per square inch). As the recording density is substantially raised with significantly reduced magnetic bit size, e.g., by one to two orders of magnitude, the magnetic field signal from each of the recorded bits is substantially reduced. Therefore, there is a need to develop a highly sensitive magnetic read head.

Another type of recording media for mass information storage is compact disc (CD). The CDs have been used mostly for read-only memory (ROM) applications, although a rapid progress is being made in the use of writeable CD disc memory technology. A CD is usually made of ~1 mm thick plastic, coated with an aluminum layer and a protective plastic coating. Information is topographically recorded as microscopic bumps or recessed holes arranged as a single or continuous spiral track of data. As the CD disc is rotated in the CD player, a laser beam, focused by a lens system, follows the track and reads the presence or absence of the bumps.

As the bit size in the current CDs is typically larger than about 200 nm, the recording density is less than a few gigabits per square inch. With the advance of information storage density in compact disc media, such as described in the above incorporated co-pending application Ser. No. 11/020,286, the information bit size of bumps or recessed holes can be extremely fine, for example, of the order of 10 to 50 nm in diameter, giving rise to a recording density of about 40 gigabits to 1 terabits per square inch. The laser optical technique can no longer effectively detect such fine nanoscale features which are well below the wavelengths of the laser beam. Therefore, there is a need to develop new techniques for reading of such nanoscale information bits on ultra-high-density CD discs.

SUMMARY OF THE INVENTION

The invention provides a micro-electro-mechanical systems (MEMS) device and method that can read very high density magnetic media and very high density CD ROMs. Read heads comprise one or more cold cathode MEMS e-beam cells. The e-beams are deflected according to the data bit being interrogated and the state of that bit is determined by a detector. Large arrays of such cells can simultaneously read large areas of the memory media. Densities as high as 200 gigabits per square inch and read speeds 1000 times faster than conventional single head systems can be achieved.

The magnetic read head can use an anode or a thin film edge detector for interrogating a magnetic bit on the magnetic storage media. In the magnetic case, one data magnetization state causes the e-beam to impinge on the anode or thin film detector, whereas the opposite magnetization state deflects the e-beam away from the detector.

In a preferred method for sensing data on an optical CD ROM, the cold cathode generated e-beam is directed through an x-ray generating material to the location to be interrogated (sensed). The x-rays deflect or diffract into a detector for an optical flat, but are bent away from the detector where there is an optical hole or a bump.

Arrays of such MEMs detectors can comprise a plurality of "steerable" e-beam emitters that can be directed to interrogate specific data sites on the magnetic media. Thus, with plural steerable emitters, the media can remain stationary.

BRIEF DESCRIPTION OF THE DRAWINGS

The advantages, nature and various additional features of the invention will appear more fully upon consideration of the illustrative embodiments now to be described in detail in connection with the accompanying drawings. In the drawings:

FIG. 6 illustrates an exemplary method of sensing the presence of recorded CD-ROM bits using one or more e-beam-generating cold cathode cells; and, FIG. 7 illustrates another exemplary method of sensing the presence of recorded CD-ROM bits using one or more nanoscale x-ray sources.

Figure 1B:
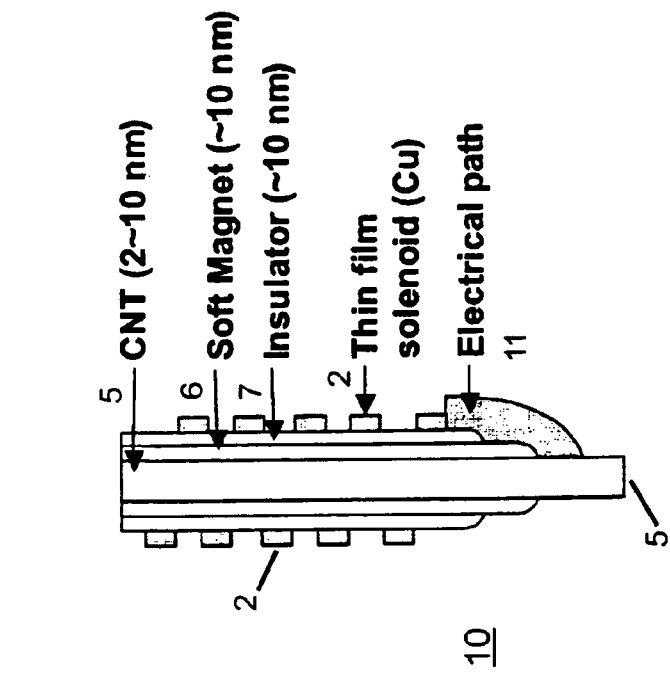
FIGS. 1A–1D schematically illustrates the design and fabrication of nano-scale coils for sensing of ultra-high-density magnetically recorded bits.

It is to be understood that the drawings are for the purpose of illustrating the concepts of the invention, and except for the graphs, are not to scale.

DETAILED DESCRIPTION OF INVENTION

Referring to the drawings, FIG. 1 schematically illustrates the design and fabrication an exemplary magnetic bit sensor 10 comprising a nanoscale pick-up coil 2 for sensing small magnetic fields from tiny magnetic bits. (The term "nanoscale" as used herein refers to components having submicron dimensions). Nanoscale sensors 10 can comprise, for example, a 2–50 nm diameter core 5 and a winding conductor 2 of diameter 1–10 nm. The core 5 can be a carbon nanotube or a silicon nanowire with a diameter as small as ~1.2 nm for a single wall nanotube (SWNT) and ~2–50 nm for a multiwall nanotube (MWNT). See articles by S. Ijima, Nature, 354, 56 (1991), K. A. Dean and B. R. Chalamala, Appl. Phys. Lett., 76, 375 (2000), W. Zhu, et al., "Large Current Density from Carbon Nanotube Field Emitters", Appl. Phys. Lett., 75, 873 (1999). For convenience of reference, the term "nanowire" will hereinafter be used to generically designate both true nanowires (solid cores) and nanotubes (hollow cores).

Figure 1D:
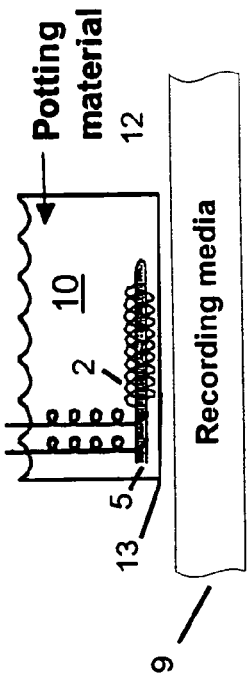
Figure 1A:
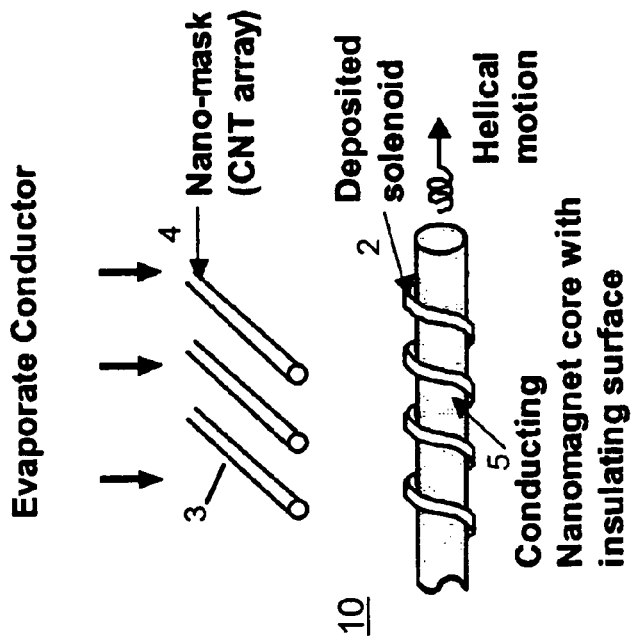

As illustrated in FIG. 1A, nanowires such as an array of nanotubes 3 arranged in parallel are used as a nano-mask 4 for physical vapor deposition of conductor winding 2 material. The deposition of a material for conductor winding material 2 (such as Cu, Al, Au and Pd) is carried out over a rod-shape core 5, which can be nonmagnetic, but preferably is made of a soft magnetic material to serve as a field-amplifying solenoid core. While the evaporation deposition (or less preferably sputtering deposition because of less line of sight nature of sputtering) is carried out through the nanomask, the core 5 is slowly rotated and moved to the right, to produce a helical pattern motion, as illustrated in FIG. 1A. This deposits a helical path of conductor 2 on the surface of the core 5. This process can be repeated, if desired, to have multilayers of electrically connected solenoid turns to increase the total number of turns and hence the pick-up signals.

The nanowire core 5 is preferably magnetically soft (e.g., it has a coercive force of less than 20 Oe and preferably less than 5 Oe). Since a nanowire of ferromagnetic material with a diameter on the order of 10 nm tends to behave like a single-domain magnet due to the shape anisotropy, it exhibits permanent magnet properties rather than the soft magnet properties desired for solenoid core. One way to impart soft magnetic properties to the nanowire is to use magnetocrystalline anisotropy perpendicular to the shape anisotropy direction (wire axis), so that the wire is nearly balanced and soft magnet properties are obtained. Another way is to use multilayer magnetic films with exchange magnetic interactions.

Figure 1C:
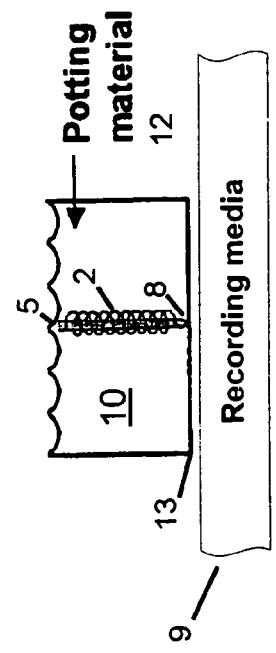

If the nanowire core 5 is not magnetic, as in the case of carbon nanotubes or silicon nanowires, a layer 6 of soft magnetic material can be deposited on the surface of the core as illustrated in FIG. 1B. The solenoid circuit is completed by adding an insulator 7 and depositing a return electrical path 11 as shown in FIG. 1B. The typical diameter of core 5 is in the range 2–50 nm. For the sake of providing an acceptable resolution for nanoscale magnetic bits, the core 5 diameter is preferably less than 1.5 times the magnetic bit diameter. If the tip 8 of the magnetic core 5 facing the magnetic disk medium 9 is tapered and pointed so as to sense smaller magnetic bits, the preferred 5 core diameter can be 1.5 times the radius of curvature of the core tip 8. The desired number of turns 2 of the solenoid winding is at least 5 turns, preferably at least 10 turns, even more preferably at least 20 turns. The completed solenoid can be potted in a polymer 12 to protect the fragile nano pick-up coil sensor 10, and also to provide a mechanically strong and flat bottom surface 13 to reliably glide over the surface of a rotating magnetic recording media (e.g. a disk), as illustrated in FIGS. 1C and 1D. The nano pick-up coil produces electromotive force (emf) voltage as a sense signal corresponding to any change in local magnetic field signal as a magnetic bit in the rotating magnetic disk 9 passes. The availability of multi-turn solenoids in a nanoscale dimension in this invention, as compared to the conventional inductive magnetic read head, allows the construction of a highly sensitive magnetic recording read head. (the term "read head" as used herein, in its broadest definition, refers to devices having not only the "read" capability but also the "write" capability in magnetic recording.

Figure 2:
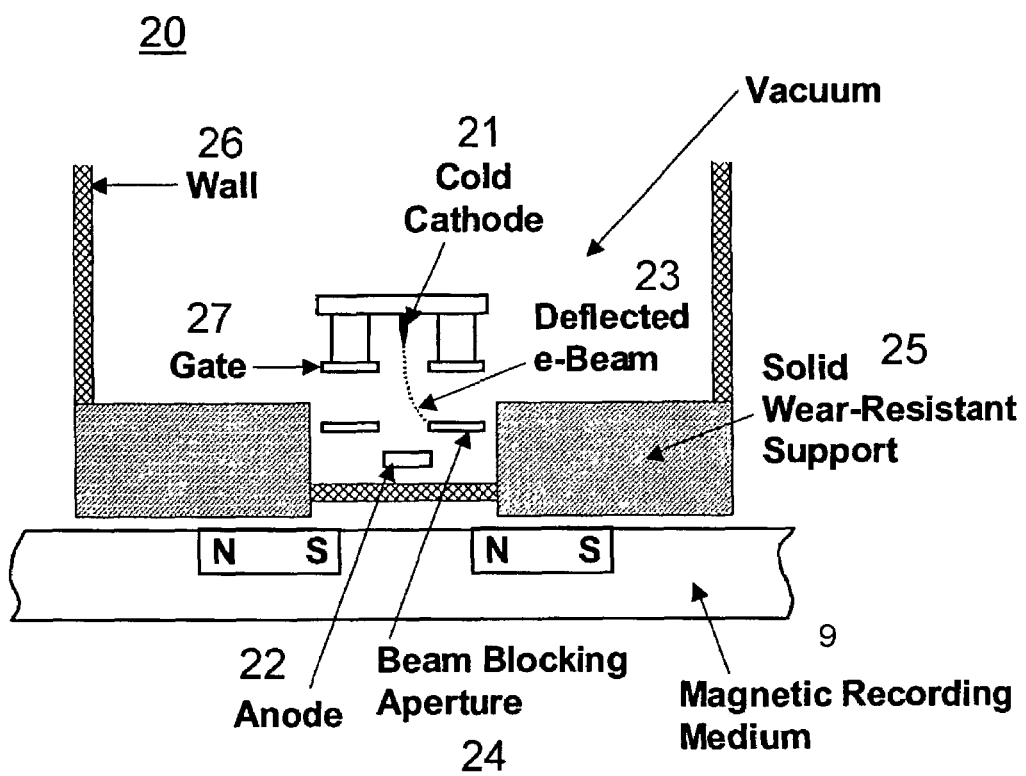
FIG. 2 schematically illustrates a first embodiment of a magnetic read head using a cold cathode.

Referring to FIG. 2, an exemplary field-emission based magnetic sensor 20 for ultra-high-density magnetic disk memory read head comprises a tiny electron emitter cold cathode read head 10 including a nanoscale cathode 21 such as a carbon nanotube, an anode 22 that detects the intensity of emitted electrons 23, a beam-blocking aperture 24, gate 27 to facilitate the emission of e-beam, and structural components comprising solid wear-resistant support 25 and a wall 26. Alternatively, instead of the beam blocking aperture 24, a series of anodes may be placed, each sensing the relative intensity of arriving emitted electrons, thus indicating the e-beam position (or the absence or presence of e-beam at their locations). The trajectory of moving electrons in vacuum is deflected by the presence of a magnetic field, with the magnitude and direction of deflection dependent on the intensity and polarity of the magnetic field. By placing a tiny electron collector (or anode 22) in the field emitter structure near the source of the magnetic field, in this case near the magnetic bit of information, one can make a very high-resolution magnetic recording head. The presence or absence of emission current 23, the polarity, or the detection of emission current on a particular anode 22 can be utilized for reading.

Figure 3:
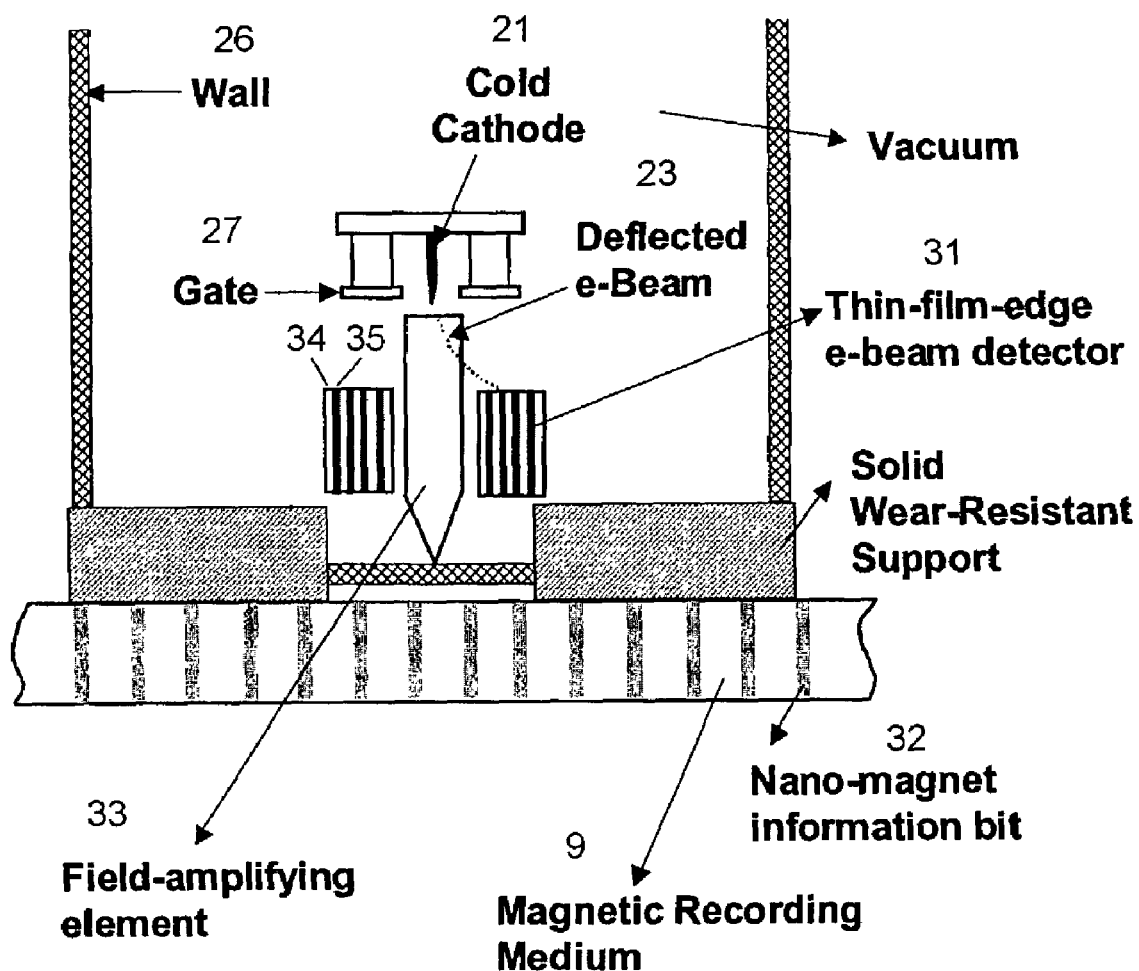
FIG. 3 illustrates another embodiment of a magnetic read head using a cold cathode and magnetic field amplifying component.

Since the magnetic field strength coming out of a magnetized bit in a conventional magnetic disk medium is typically less than several hundred gauss, this value will be even smaller in ultra-high-density recording media. With smaller bit sizes, the extent of beam deflection by a passing magnetized bit is very small. It is therefore desirable to amplify the magnetic field signal from the magnetic bit by at least one order of magnitude (×10), and preferably by at least two orders of magnitude (×100). FIG. 3 illustrates a magnetic sensor 30 including a field amplifier element 33. The field amplifying element can be made of soft magnet material and be placed in the read head 30 at a location close to the magnetized bit 32. The field-amplifying element 33 reaches close to the tip of the cold cathode emitter 21, but is advantageously positioned slightly behind the emitter tip, so that some component of the now-amplified magnetic field coming off the upper end of the element 33 has an orientation perpendicular to the electron emission direction. The electron beam then deflects toward the side of element 33.

In order to detect a minute deflection in the e-beam direction, a nanoscale thin-film multilayer edge detector 31 can be placed near the deflecting e-beam. The thin-film multilayer edge detector 31 is advantageously fabricated by depositing alternating layers of conductor 35 and insulator 34, with the cross-sectioned edge of the multilayer receiving the deflected e-beam. This layered structure is equivalent to an array of anodes, except that each anode conductor can now be as narrow as several angstroms. The desired dimension of each of the electron sensing electrodes in the inventive thin film multilayer edge detector is less than 500 nm, preferably less than 50 nm, even more preferably less than 5 nm. Each conducting layer can be interrogated to check the intensity of the e-beam deflection to that location. Since the conductor and the insulator layers in this thin-film edge detector are very thin, care must be taken to avoid pin-hole-induced electrical shorting and spurious tunneling signals.

The field-emission magnetic field sensors of FIGS. 2 and 3 can be used as single heads or a plurality of them can be deployed in a two-dimensional array with the e-beam being maneuverable by either MEMS operation or by electrostatic operation. Such a maneuverable e-beam source in a two-dimensional array configuration is described in a provisional U.S. patent application Ser. No. 60/405,561 entitled "*MEMs-Based Two-Dimensional E-Beam Nano Lithography Device and Method for Making the Same*", by S. Jin, filed Aug. 23, 2002 which is incorporated herein reference.

Figure 4:
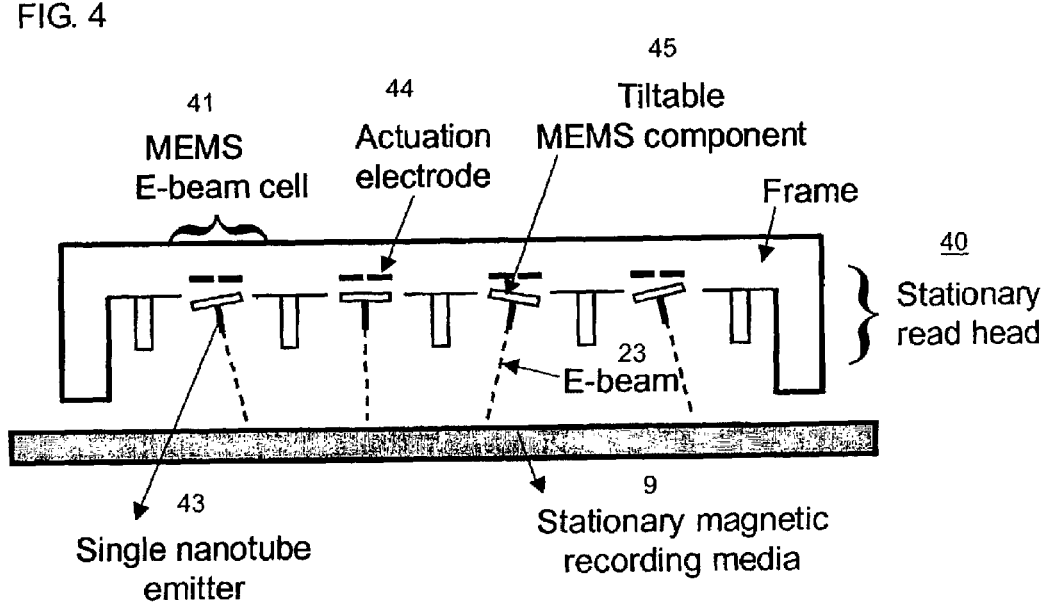
FIG. 4 schematically illustrates a two-dimensional magnetic read head comprising an array of tiltable cold cathode cells.

FIG. 4 illustrates a two-dimensional array 40 of magnetic read heads 40 that are maneuverable by MEMS operation. For the sake of simplicity the e-beam focusing lens, the field-amplifying element and the deflection-detecting thin-film edge detectors are not shown. This type of read head comprises an array of magnetic field sensors based on cold cathode emitters 43. The cold cathode emitters 43 are variably positioned by respective tiltable MEMS components 45 controlled by actuation electrodes 44. The array can be stationary with respect to the magnetic recording medium 9 that faces the head.

Figure 5:
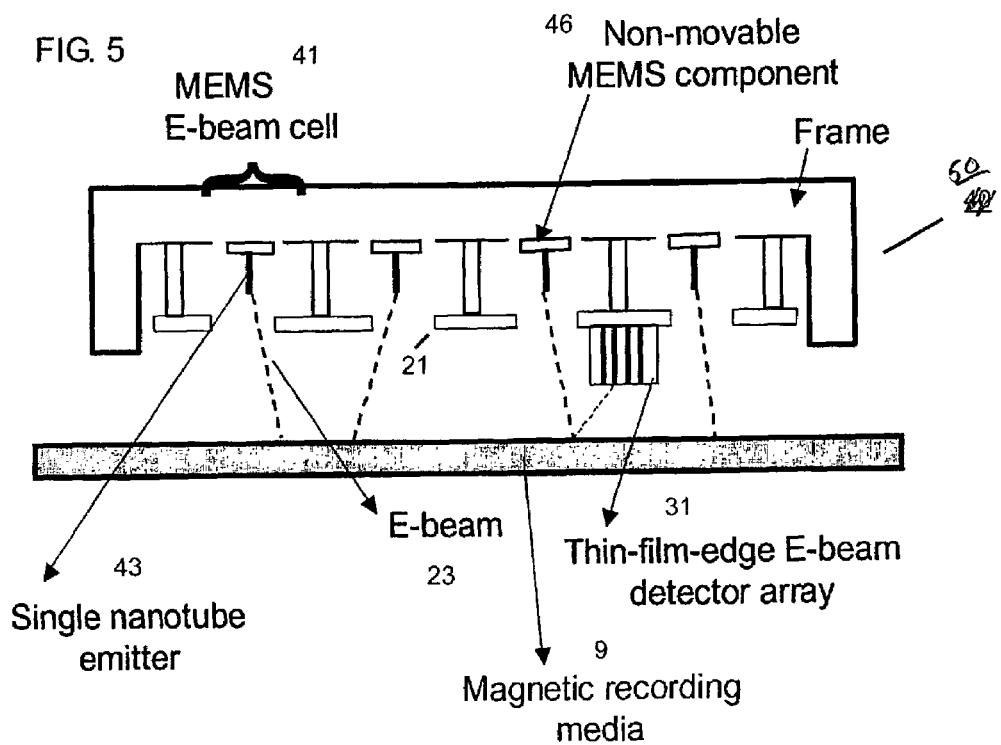
FIG. 5 schematically illustrates a two-dimensional magnetic read head comprising an array of stationary e-beam scannable cathode cells.

In FIG. 5, which shows an array 50 maneuverable by electrostatic operation, the emitters 43 include non-moveable MEMS components 46. Here each beam is steered electrostatically by a respective gate 21. The gate desirably has at least two, preferably at least three independently controllable sections so that an asymmetric electric field can be applied to steer the electron beam toward any desired direction within the aperture area. With the absence of moving parts in this approach, many of the complications and reliability issues related to the high-speed rotation of magnetic disks, head-media stiction and crash problems, as well as the movement of the head to various track locations on the hard disk are no longer of concern in this device.

Such a stationary magnetic reader 50 based on two-dimensional maneuverable e-beam source can also be used as a stationary magnetic write head. Since the e-beam can locally heat the magnetic bit-sized spot, an application of bias field (either global or local) can flip the magnetization of only the heated region where coercivity is reduced by heating.

Another major advantage of the stationary, two-dimensionally arrayed read/write head is the enormous speed of magnetic information read or write. The read/write operation is carried out simultaneously by all the cold cathodes 43, instead of a single read/write head in the conventional magnetic disk system. For example, if there are $10^6$ e-beam sources in the array, the speed of information management can be as much as one million times faster, assuming that the e-beam sensing takes about the same time as magnetic sensor sensing of each magnetic bit. The two-dimensional magnetic read/write head is desirably at least 1000 times faster, and preferably at least one million times faster than a single MR or GMR head for handling the same number of information bits.

As in the case of magnetic information storage, progress is being made in increasing the information storage density in compact disc media. See, for example, co-pending U.S. patent application Ser. No. 10/262,462, "Ultra-high-density information storage medium and method for making the same" by S. Jin, filed on Sep. 30, 2002, which is incorporated herein by reference. The information bit size of bumps or recessed holes can be extremely fine, for example, of the order of 10 to 50 nm in diameter, giving rise to a recording density of about 40 gigabits to 1 terabits per square inch. The optical laser technique can not effectively detect such fine topographical nanoscale features that are much smaller than the wavelengths of the laser beam. Therefore, there is a need to develop new and convenient techniques which will allow reading of such nanoscale information bits on ultra-high-density CD discs.

FIG. 6 illustrates an exemplary CD-ROM reader 60 which can resolve such a high density recorded information. The reader 60 is based on a two-dimensional, maneuverable cold cathode array 61, such as disclosed in provisional U.S. Patent application Ser. No. 60/405,561 and an x-ray generating metal film 64. As the e-beams from the cold cathode array hit the x-ray generating metal film 64, x-ray beams 63 are generated which pass through to reach the CD-ROM media 10 for the interrogation of information bits 62.

The principle of the CD-ROM reader 60 is schematically illustrated in a magnified drawing as shown in FIG. 7. As the x-ray beam 63 hits the recorded information bit such as a hole 71 (or a bump) in FIG. 7B, the reflected or diffracted beam 72 is different compared to the case of flat region 73 with no information bit (FIG. 7A). Thus the magnitude or the nature of a sense signal picked up by an x-ray sensor such as a charged couple device (CCD) 74 is different depending on whether a topographically different local region is present or not. The recorded bits can be in the form of individual holes or a connected, elongated stripe of depressed regions. The bits can also be of the depressed cavity type or protruding bump type. A compact disc "write" capability can also be provided using the presence of an array of electron-beams (and without the x-ray generating part), which can be used as a means for locally heating the CD media to melt the region near the desired holes or bumps to remove or reduce the distinct topological shape that constitutes the recorded bit. The repeatability of such an operation may be limited, so this approach can be more suitable for applications that require only a limited number of times of writing or rewriting. Alternatively, such a local heating can be utilized to write or erase recorded bit information on phase-transition type CD media. Instead of using a light beam (such as a laser) as in the conventional CD system to locally heat and read or write a bit on such phase-transition media, this invention uses the local heating capability of array e-beams. The information writing speed can thus be orders of magnitude faster according to the invention.

Referring back to FIG. 6, the two-dimensional array CD-ROM read head 60 also allows for stationary operation of disc 10, with no high speed rotation necessary. Thus the chance for mechanical failures is reduced. The movement of the read head to follow various tracks is also eliminated. Even the local tilt motion of cold cathode in each MEMS cell 41 can be eliminated, if desired, by resorting to an alternative e-beam tilting mechanism based on electrostatic guiding referred to earlier in this application and as disclosed in a provisional U.S. patent application Ser. No. 60/405,561. A major advantage of such a stationary, two-dimensionally arrayed CD-ROM read head 60 is of course the enormous speed of information read or write. The read/write operation is now carried out simultaneously by all the cold cathode emitters 43, instead of a single read/write head in the conventional CD player system.

EXAMPLE

With $10^3$ e-beam sources in an array, the speed of information management can be about thousand times faster than for a single source reader such as a laser-based CD-ROM reader. If there are $10^6$ e-beam sources, the speed will be about one million times faster. The two-dimensional CD-ROM reader is desirably at least 1000 times faster, and preferably at least one million times faster than the conventional, laser-based CD-ROM reader for reading the same number of information bits.

It is understood that the above-described embodiments are illustrative of only a few of the many possible specific embodiments which can represent applications of the invention. Numerous and varied other arrangements can be made by those skilled in the art without departing from the spirit and scope of the invention.

What is claimed is:

1. A magnetic read head for reading information magnetically recorded on a medium at a density of at least 200 gigabits per square inch comprising:
   at least one nanoscale cold cathode electron emitter for emitting an electron beam toward the medium on which the information is magnetically recorded; and
   at least one sensor for detecting the deflection of the electron beam by magnetically recorded information on the medium.

2. The read head of claim 1 further comprising one or more electrodes adjacent the path of the emitted electron beam for directing the beam.

3. The read head of claim 2 wherein the at least one emitter comprises a plurality of emitters disposed in a two dimensional array.

4. The read head of claim 1 further comprising a MEMS component mechanically coupled to the emitter for directing the emitter and thereby directing the beam.

5. The read head of claim 4 wherein the at least one emitter comprises a plurality of emitters disposed in a two dimensional array.

6. The read head of claim 1 further comprising a magnetic amplifier disposed between the emitter and the medium on which the information is magnetically recorded for amplifying the magnetic field of the magnetically recorded information on the medium.

7. The read head of claim 1 wherein the sensor comprises a thin film edge e-beam detector.

8. The read head of claim 1 wherein the at least one emitter comprises a plurality of emitters disposed in a two dimensional array.

9. The read head of claim 1 wherein the at least one emitter comprises a plurality of emitters arranged so to read the information recorded on the medium without moving the medium.

10. A read head for reading information topographically recorded at a density of at least 200 gigabits per square inch comprising:
    at least one nanoscale cold cathode electron emitter for emitting a primary electron beam toward a medium on which the information is topographically recorded; and
    at least one sensor for detecting the deflection of the primary electron beam by the topographically recorded information on the medium.

11. The read head of claim 10 further comprising one or more electrodes adjacent the path of the emitted electron beam for directing the beam.

12. The read head of claim 10 further comprising a MEMS component mechanically coupled to the emitter for directing the emitter and thereby directing the beam.

13. The read head of claim 10 wherein the at least one emitter comprises a plurality of emitters disposed in a two dimensional array.

14. The read head of claim 10 wherein the at least one emitter comprises a plurality of emitters arranged to read the information recorded on the medium without moving the medium.

* * * * *